May 2, 1961
S. S. BROWN
2,982,134
FLUID SAMPLER AND METERING DEVICE
Filed June 1, 1956
2 Sheets-Sheet 1
FIG. 1.  FIG. 2.  FIG. 3.  FIG. 4.
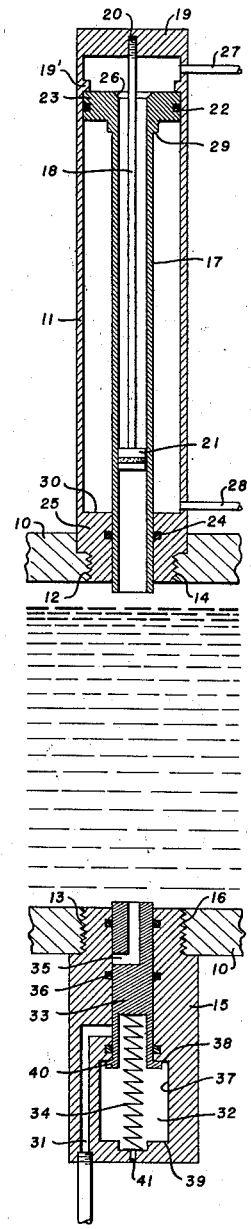
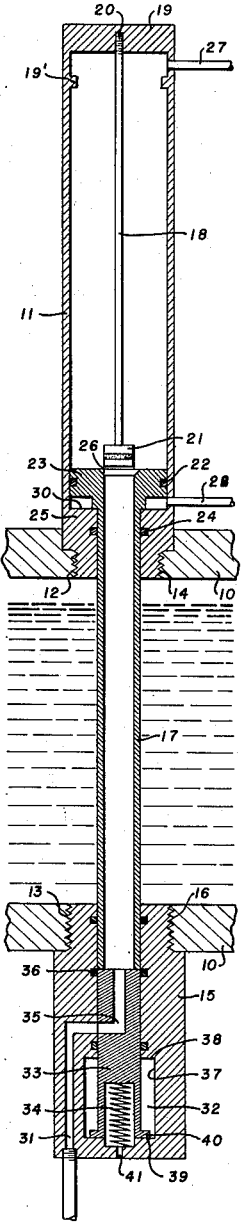
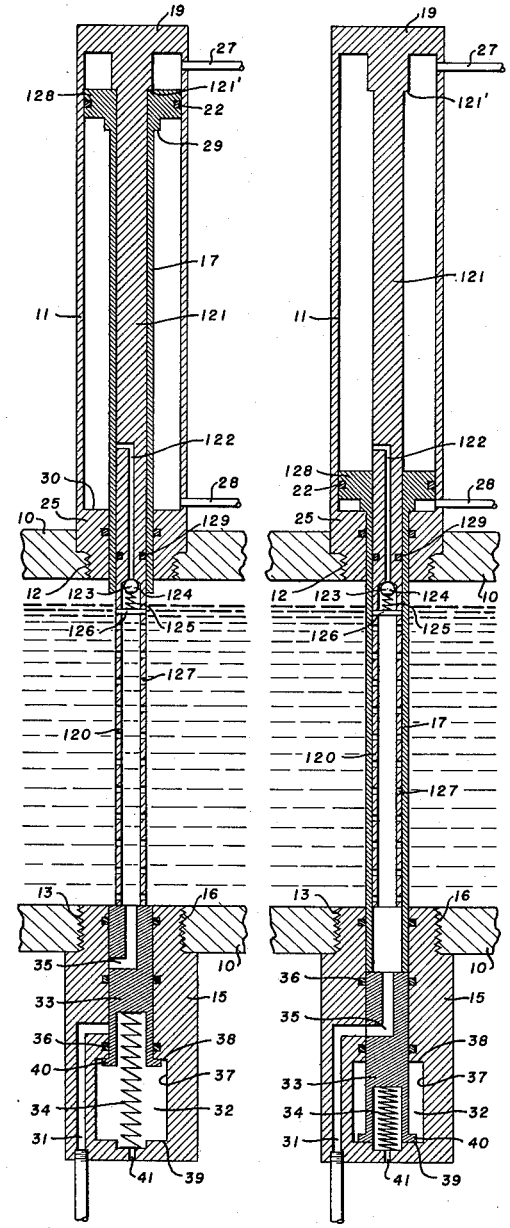
INVENTOR.
Stephen S. Brown,
BY John D. Schneider
ATTORNEY.

May 2, 1961 S. S. BROWN 2,982,134
FLUID SAMPLER AND METERING DEVICE
Filed June 1, 1956 2 Sheets-Sheet 2
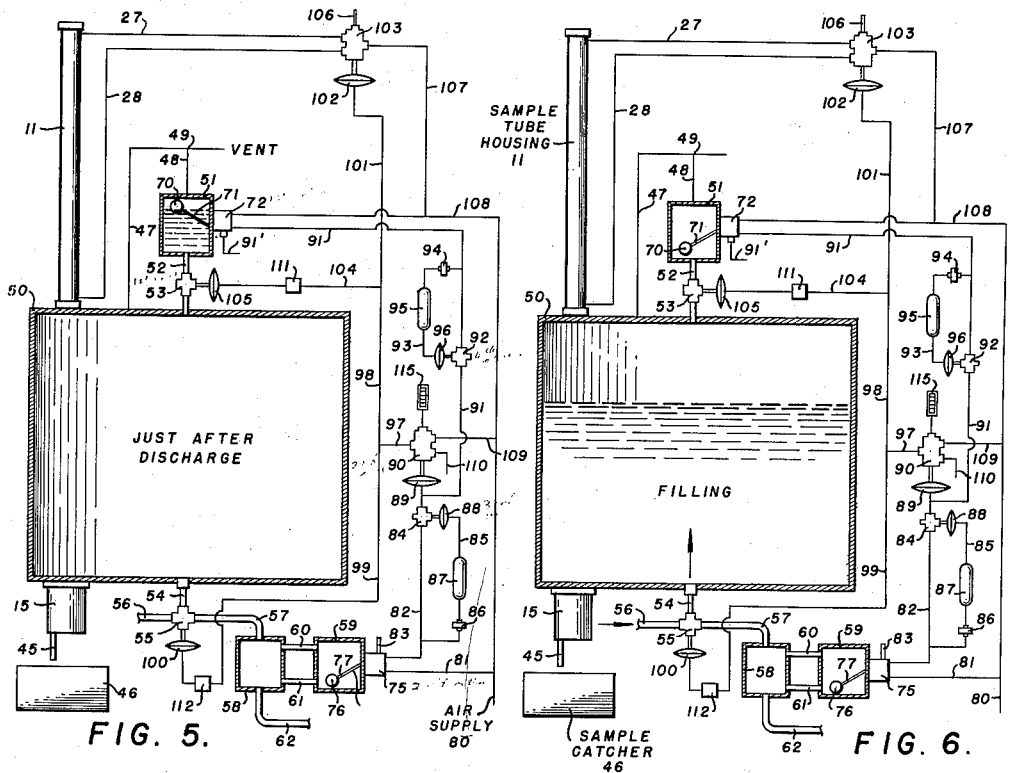
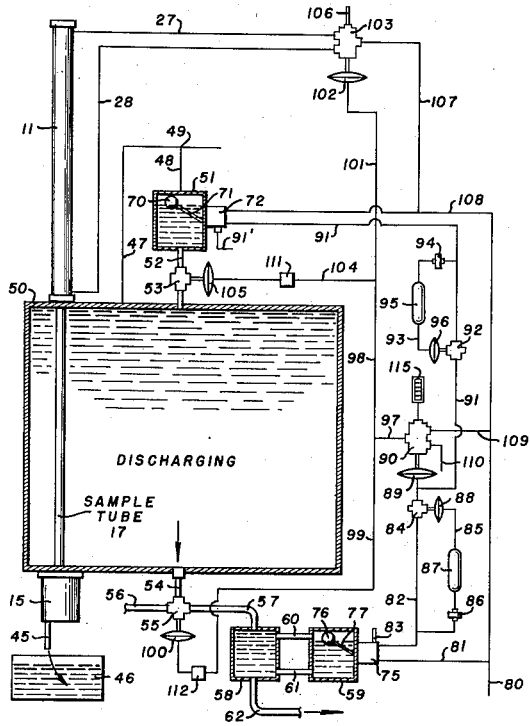
INVENTOR.
Stephen S. Brown,
BY
ATTORNEY.

United States Patent Office 2,982,134
Patented May 2, 1961

2,982,134

FLUID SAMPLER AND METERING DEVICE

Stephen S. Brown, La Porte, Tex., assignor, by mesne assignments, to Jersey Production Research Company, Tulsa, Okla., a corporation of Delaware Filed June 1, 1956, Ser. No. 588,778

10 Claims. (Cl. 73—198)

This invention is directed to a device for taking fluid samples. More specifically it is directed to a device for taking samples of fluid flowing in a pipe or retained in a vessel or receptacle.

This invention is also directed to a liquid sampling device adaptable for use with a fluid meter whereby a fluid sample is taken in each metering cycle.

An object of this invention is to provide a device to sample fluid flowing in a conduit, or retained in a vessel, without affecting the pressure of the system, the flow of fluid, or risking contamination or escape of the fluid to be sampled.

A further object of this invention is to provide a metering and sampling control system whereby fluid in a metering vessel is sampled in each metering cycle.

The customary procedure in sampling fluids heretofore was to tap the vessel containing the fluids and draw off a desired sample. However, this method is disadvantageous since, when the fluid is a mixture of several fluids which separate and settle out, it is difficul to determine where to tap the vessel in order to obtain a representative proportional sample. Generally, it is necessary to tap the vessel in several representative locations; however, even then the quantity taken by each tap influences the percentage make-up of the composite sample. This invention overcomes these disadvantages by providing a sampling device wherein the sampler traverses completely the receptacle thereby obtaining a true, representative proportion of the fluids contained in the receptacle.

Briefly, the invention comprises a receptacle having oppositely disposed openings therein. A housing is mounted on one of the receptacle openings. Tubular piston means is slidably arranged in the housing and extensible through the openings and is adapted to remove fluid samples from the receptacle. Valve means is positioned on the other of the receptacle openings and is adapted to fluidly communicate the interior of the piston means and the exterior of the receptacle when the piston means extends through the openings, and means operative in the housing is provided for moving or reciprocating the piston means. A modification of this invention includes a perforated guide means which extends through the receptacle and upon which the tubular piston means is slidably arranged. The invention, as noted supra, also contemplates a fluid sampling and metering device. Briefly, this modification comprises a metering tank provided with first valve means for controlling admission and discharge of fluid to and from the tank. A chamber is mounted on the tank and second valve means is positioned between the chamber and the tank adapted to selectively permit and prevent fluid flow therebetween. First control means connected to the chamber operatively responsive to the fluid level in the chamber and second control means fluidly communicating with the first valve means operatively responsive to the liquid discharge from the tank are provided. A housing is mounted on the tank and tubular means is provided slidably arranged in the housing and extensible through the tank adapted to remove a fluid sample from the tank. A body member is mounted on the tank and provided with a passageway fluidly communicating the interior and exterior of the body member. Third valve means is arranged in the body member and is adapted to fluidly communicate the interior of the tubular means and the passageway when the tubular means extends through the tank. A pneumatic system is provided comprising an air source and first and second diaphragm actuated valves. The first and second control means cooperate to control actuation of the first diaphragm valve which in turn controls actuation of the second diaphragm valve, the second diaphragm valve being adapted to control fluid flow to and from the piston means.

Referring to the drawings:

Fig. 1 is a cross-sectional view of the sampler device positioned on a receptacle;

Fig. 2 is a view similar to Fig. 1, however, herein the sample tube is shown extended through the receptacle in sample taking position;

Fig. 3 is a cross sectional view of a modified sampler device positioned on a receptacle;

Fig. 4 is the sampler device of Fig. 3 showing the sample tube extended through the receptacle in sample taking position;

Fig. 5 is a diagrammatic view of the sampler device positioned on a metering tank and the system of controls for cyclically operating the metering tank and sampler device;

Fig. 6 is a view similar to Fig. 5 showing the system during a filling cycle; and Fig. 7 is a view similar to Fig. 5 showing the system during a discharging cycle.

The arrows designate the direction of fluid flow.

Referring more specifically to the drawings wherein identical numerals designate identical parts, Figs. 1 and 2 show a receptacle 10 upon which is mounted a housing 11. The receptacle 10 is provided with oppositely disposed openings 12 and 13. Housing 11 is screw threadedly connected to receptacle 10 in opening 12 as at 14 and a body member 15 is screw threadedly connected in opening 13 as at 16. Housing 11 is provided with an open-ended tubular piston sampling member 17 slidably arranged therein. Piston member 17 is extensible completely through receptacle 10, as seen more clearly in Fig. 2. A rod 18 is screw threadedly connected to the top 19 of housing 11 as at 20. Rod 18 is provided, at its free end, with a sealing head or plug member 21. Sealing members 22, which may suitably be O-rings, are provided on piston member 17 between the head 23 of piston member 17 and the wall of housing 11. Also, O-rings 24 are provided on the interior of the base 25 of housing 11 to sealingly engage tubular piston 17. Head 23 of piston member 17 is provided with an annular tapered or beveled portion 26 adjacent the upper end thereof. Inlet and outlet conduits 27 and 28 fluidly communicate the interior of housing 11 with a source of fluid pressure not shown. Piston member 17 is also provided with an upper shoulder portion 29 which is adapted to engage with the interior surface 30 of base 25 of housing 11 when the piston member is in its lower position as shown in Fig. 2. The interior of housing 11 is formed to provide an annular stop 19' which engages head 23 to limit the upward movement of tube 17. Body member 15 is provided with a fluid passage 31 and a valve chamber 32. Passage 31 fluidly communicates the interior of the valve chamber 32 and the exterior of body member 15. A valve member 33 is movably arranged in valve chamber 32 and is normally biased upwardly by means of spring 34. Valve member 33 is provided with a passageway 35. A plurality of sealing members 36, which may suitably be O-rings, are provided on body 15 to sealingly engage with valve member 33. Valve chamber 32 is provided with an enlarged portion 37 which forms upper and lower shoulders 38 and 39. Valve member 33 is provided with an annular outwardly extending shoulder 40 which engagedly connects with shoulders 38 and 39 to limit the upward and downward movement, respectively, of valve member 33.

As seen more clearly in Fig. 2, piston member 17 extends downwardly through receptacle 10 to engage with valve member 33 to force the valve member 33 downwardly. Upon reaching the lowermost position the beveled surface 26 of piston member 17 provides fluid communication between the interior of housing 11 and the interior of the piston member 17 below sealing head 21. An opening 41 may be provided in body member 15 fluidly communicating valve chamber 32 and the exterior of body member 15 to equalize pressures within and outside of body member 15 and to discharge any fluids which may enter valve chamber 32 by leakage past seals 36.

In operation, when it is desired to take a fluid sample, fluid pressure is exerted or applied to the head 23 of piston member 17 via conduit 27. Piston member 17 then moves downwardly until it engages with and forces valve member 33 downwardly against the bias of spring 34. When shoulder 29 engages with the shoulder 30 of the base 25 of housing 11 and the shoulder 40 of valve member 33 engages with the shoulder 39 of body member 15, passageways 35 and 31 are aligned and the interior of piston member 17 is in fluid communication with the interior of housing 11. Fluid in receptacle 10 passes into the lower open end of piston member 17 as piston member 17 moves downwardly through receptacle 10 and is isolated therein, upon engagement of tubular member 17 with valve member 33. Further downward movement of tubular member 17 causes fluid communication between the interior of housing 11 and the interior of piston member 17. The fluid pressure employed to move piston member 17 downwardly thus enters tubular member 17 and forces the isolated fluid sample from tubular member 17 through aligned passages 35 and 31. Piston member 17 is retracted by applying fluid pressure through conduit 28, which moves piston member 17 upwardly thereby forcing the fluid above piston member 17 outwardly to discharge through conduit 27. The fluid pressure retained within tubular member 17 below the sealing head 21 of rod 18 is then discharged thereby to the fluids contained within receptacle 10.

Figs. 3 and 4 show a modified sampling device. Herein a guide tube 120 is provided in receptacle 10. The upper end of guide tube 120 is formed integral with or is connected to a shaft 121 arranged in housing 11. A passageway 122 is formed in shaft 121 which is adapted to fluidly communicate the interior of housing 11 and the interior of the guide tube 120 when sample tube 17 extends through the recepacle as in Fig. 4. A valve 123 is positioned in guide tube 120 adjacent the lower end of passageway 122 and as shown includes a ball member 124, a spring member 125 and a perforated support member 126. Guide tube 120 is provided with perforations or openings 127 which are formed therein in staggered relation to insure that the level of liquid in the receptacle is the same at all times as the level of liquid within the guide tube 120. Instead of the staggered perforations longitudinally extending slotted openings may be provided.

The lower valve member including the valve chamber and the passageways is identical to that disclosed in Figs. 1 and 2.

In housing 11 sample tube 17 is provided with a piston head 128 similar to the piston head 23 and associated sample tube 17 of Figs. 1 and 2. However, herein the piston head 128 and associated sample tube 17 are slidably arranged on shaft 121 and head 128 is not provided with a tapered portion. Also, additional sealing means 129 are provided on shaft 121 below the opening of passageway 122 and the interior of the housing 11 to seal off flow of fluid between shaft 121 and sample tube 17. Shaft 121 may be provided with a shoulder 121' which serves as a stop to limit the upward movement of sample tube 17.

Fig. 4 shows the sample tube in extended position similar to Fig. 2 of the previous embodiment.

In operation, similarly to the operation described relative to Figs. 1 and 2, when it is desired to take a sample, fluid pressure is exerted or applied to the head 128 of sample tube 17 via conduit 27. Sample tube 17 is thereby forced downwardly sliding along shaft 121 and guide tube 120 until it engages with and forces valve member 33 downwardly. When shoulder 29 engages with the shoulder 30 of the base 25 of housing 11 and the shoulder 40 of valve member 33 engages with shoulder 39 of body member 15, passageways 35 and 31 are aligned in body member 15 and the interior of the guide member 120 is in fluid communication with the interior of housing 11 via passageway 122 in housing 11 as seen more clearly in Fig. 4. The valve 123 closes off fluid communication from the interior of the receptacle 10 to the interior of housing 11. However, the pressure employed in forcing piston head 128 and associated tube 17 downwardly overcomes the bias of spring member 125 and permits flow of fluid from the interior of housing 11 to the interior of the guide tube when the piston head 128 is below the passageway 122 opening into the interior of housing 11.

Thus, fluid in guide member 120 is trapped within the guide member 120 by sample tube 17 moving downwardly about the guide member 120 and pressure in housing 11 forces valve 123 open to force the fluid sample entrapped in guide tube 120 through passageways 35 and 31. Sample tube 17 is retracted by applying fluid pressure through conduit 28 which moves piston member 17 upwardly thereby forcing the fluid above piston member 17 outwardly to discharge through conduit 27. The fluid retained within tubular member 17 below the valve member 123 is discharged to the fluids contained within receptacle 10 through the perforations 127 in guide member in guide member 120 as the sample tube 17 is retracted.

Figs. 5 through 7 disclose the sampling device in conjunction with an automatic fluid metering system. The sampling device illustrated in Figs. 3 through 5 may be that as disclosed in Figs. 1 and 2 or the modification as disclosed in Figs. 3 and 4.

Fig. 5 shows the system just after the tank is discharged. Fig. 6 shows the system when the tank is filling and Fig. 7 shows the system when the tank is discharging.

In the following description of the control system 2-, 3-, and 4-way spring biased diaphgram valves are employed. These valves are adapted to actuate to one position upon the application of a fluid pressure signal or pulse on the diaphragm of the valve and to move to an original position under the bias of the spring upon the exhaust or bleeding of the pressure signal or pulse from the diaphragm. These valves are conventional in the art and form no part of the present invention.

In metering fluids, in many instances, it is desirable that a sample of the fluids contained in the tank be taken at each meter cycle, the sampling device of this invention is readily adaptable to such operation in an automatic metering system. Figs. 5 to 7 show a metering tank 50 on top of which is mounted a chamber 51. A conduit 52 fluidly communicates tank 50 and chamber 51. A diaphragm actuated valve 53 is positioned in conduit 52 and is adapted to permit and prevent fluid flow between tank 50 and chamber 51. A conduit 54 connects into the bottom of tank 50 and is connected into a 3-way diaphragm actuated valve 55. In one position diaphragm valve 55 fluidly communicates a fill, inlet conduit 56 and conduit 54 and in another position closes off fluid communication between conduits 56 and 54 and fluidly communicates conduit 54 and a discharge conduit 57. Conduit 57 connects into a chamber 58 to which is connected a chamber 59 by means of conduits 60 and 61. A discharge conduit 62 connects into the lower end of chamber 58.

A sampler housing 11 is positioned on tank 50 and is provided with conduits 27 and 28. A body member 15 is positioned on the bottom side of a tank 50 and has fluidly communicating therewith a conduit 45 which empties the sample taken into a receptacle 46. Chamber 51 is provided with a control means responsive to the liquid level in chamber 51 and includes a float 70 connected to a pivotable rod 71 which engages with a valve means 72. Lower chamber 59 provides another control means 75 responsive to the liquild level in chamber 59 and includes a float 76 connected to a pivotable rod 77 which connects with a valve means 75.

An air or gas source supply 80 connects with valve means 75 by means of conduit 81. Valve means 75 also connects with a conduit 82 and an exhaust conduit 83. A normally open diaphragm actuated valve 84 is positioned in conduit 82 and a conduit 85 provided with an orifice 86 and a volume chamber 87 connects the diaphragm 88 of valve 84 and conduit 82 between valve 84 and valve means 75. Conduit 82 connects into the diaphragm 89 of a 4-way valve 90. A conduit 91 fluidly communicates conduit 82, between valve 84 and diaphragm 89, and valve means 72. A normally closed diaphragm valve 92 is positioned in conduit 91 and a conduit 93, provided with an orifice 94 and a volume chamber 95, connects conduit 91 between valve 92 and valve means 72 with diaphragm 96 of valve 92. A conduit 97 connects valve 90 with conduits 98 and 99 which latter conduit connects with diaphragm 100 of valve 55 and which former conduit connects with a conduit 101 which in turn connects with diaphragm 102 of a 4-way valve 103. Conduit 98 also connects with conduit 104 which in turn connects with diaphragm 105 of valve 53. Conduits 27 and 28 connect the upper and lower ends of housing 11, respectively, with valve 103 which is also provided with an exhaust conduit 106 and a conduit 107 which fluidly communicates valve 103 and conduit 108. Conduit 108 fluidly communicates source of fluid supply 80 and valve means 72.

A conduit 109 connects source of fluid supply 80 with valve 90. Valve 90 is also provided with an exhaust conduit 110. Tank 50 and chamber 51 may be provided with pressure release conduits 47 and 48 which may be interconnected as at 49.

In operation, assuming the tank 50 has just emptied or discharged, float 76 drops to a low position upon the discharge of fluid through chamber 58, conduit 60, chamber 59, conduit 61 and discharge conduit 62 as shown in Fig. 5. Valve means 75 is arranged to transmit a pressure signal from supply source 80 to conduit 82 when float 76 is in a low position and to exhaust conduit 82 through conduit 83 when in a raised position. Thus, a pressure pulse or signal from air supply 80 passes through conduit 82, valve 84 to diaphragm 89. Pressure applied to diaphragm 89 causes valve 90 to fluidly communicate conduit 97 and exhaust conduit 110 whereby pressure on diaphragms 100, 105 and 102 is exhausted or bled through conduits 99, 97; 104, 98, 97; and 101, 98, 97, respectively. Simultaneously therewith, a fluid pressure pulse passes through conduit 85, orifice 86, and chamber 87 to diaphragm 88 of valve 84 thereby closing valve 84 to close off fluid flow through conduit 82 to diaphragm 89. Bleeding of the pressure signal in conduit 104 causes valve 53 to open. Bleeding of the pressure signal from diaphragm 100 causes valve 55 to fluidly communicate conduits 56 and 54 and to close off fluid communication between conduits 54 and 57. Upon opening of valve 53 the fluid contained therein flows into tank 50 thereby causing float 70 to drop to a low position and thereby apply a pressure signal from air supply 80 through conduit 108 and valve means 72 to conduit 91 and thence to diaphragm 89 to maintain a signal pressure upon diaphragm 89 and thereby maintain a bleed signal in conduits 104, 101 and 99. Since valve 92 is a normally closed valve this signal is delayed since it must pass first through conduit 91, orifice 94 and valve chamber 95 to open valve 92 upon application of pressure to diaphragm 96.

This is the positioning of the control means 70, 71 and 72 and 75, 76 and 77, respectively, and the various valves, as shown in Fig. 6, the filling cycle. In this cycle conduit 101 is exhausing the pressure signal on diaphragm 102 through conduit 97, valve 90 and conduit 110 to fluidly communicate conduit 27 and exhaust conduit 106 in valve 103 and to fluidly communicate conduits 107 and 28 to maintain the sampler tube 17 in the up or inoperative position. (See Figs. 1 and 3.)

When the tank 50 has completely filled, fluid enters chamber 51 through open valve 53. Upon reaching a selected or predetermined level in chamber 51, as shown in Fig. 7, float 70 actuates valve means 72 to fluidly communicate conduits 91 and 91' and to close off fluid communication between air supply conduit 108 and conduit 91. Exhausting conduit 91 causes bleeding of the pressure signal, through conduit 93, orifice 94 and volume chamber 95, on diaphragm 96 thereby permitting valve 92 to close. However, prior to this delayed closing of valve 92, pressure has been released from diaphragm 89 of valve 90 thereby actuating valve 90 to cause a pressure pulse to pass through conduit 108, conduit 109 and conduit 97 and thence through conduits 98 and 104 to diaphragm 105 to close valve 53. Simultaneously therewith, a pressure signal or pulse passes through conduit 101 to diaphragm 102 thereby actuating valve 103 to fluidly communicate pressure source 80, through conduits 108 and 107, and conduit 27 and to exhaust conduit 28 through conduit 106. This causes sample tube 17 to move downwardly through tank 50 thereby taking a sample of fluid at the completion of each fill cycle (see Figs. 2 and 4). Sample tube 17 will remain extended through tank 50 until the tank has completely discharged, at which time it will retract, as described supra.

Also, a pressure pulse passes from conduit 97 through conduit 99 to diaphragm 100 to fluidly communicate conduits 54 and 57 and to close off fluid communication through conduits 54 and 56. This causes the tank 50 to start discharging, which causes fluid to pass through chamber 59 via conduits 60 and 61 thus moving float 76 to an up position as seen in Fig. 7. Movement of rod 77 upwardly actuates valve means 75 to bleed or exhaust conduit 82 through exhaust conduit 83 and to close off air supply 81. This in turn bleeds pressure in conduit 85 and pressure on diaphragm 88 through valve chamber 87 and orifice 86 thereby causing valve 84 to open and hence bleed diaphragm 89. As noted, valve 92 is a normally closed valve and closes after the initial release of pressure from diaphragm 89; thus release of pressure in conduit 82 maintains an exhaust from diaphragm 89 and the positions of valves 53 and 55 are not affected since the pressure pulse continues to pass through valve 90 via conduits 109 and 97.

It is important that valve 53 closes before valve 55 is positioned to discharge tank 50 through conduit 57. Also, it is important that valve 55 closes off fluid flow through conduits 54 and 57 before valve 53 opens because to obtain an accurately measured tank of fluid additional fluid from either chamber 51 or conduit 56 obviously increases and distorts the accuracy of the measured tank of fluid. To insure that these valves so operate, a speed control valve 111 may be placed in conduit 104 and a speed control 112 may be placed in conduit 99 adjacent their respective diaphragms 105 and 100. In the discharge cycle it is desired that speed control valve 112 delays the pressure signal to diaphragm 100 before the pressure signal going to diaphragm 105 actuates valve 53 thereby insuring that valve 55 will not fluidly connect conduits 54 and 57 to discharge fluid from tank 50 until after valve 53 has closed completely. Also, in the fill cycle speed control valve 111 delays the exhaust signal coming from diaphragm 105 to delay opening of valve 53 until after the exhaust signal from diaphragm 100 has actuated valve 55 to close off completely conduits 54 and 57 and open fluid communication between fill conduit 56 and conduit 54.

A counter mechanism 115 may be employed to register or indicate each filling and discharging metering cycle. The counter may be connected to valve 90 in the passage of the valve connecting conduits 109 and 97 whereby a pulse or pressure through conduits 109 and 97 will register on the counter 115.

As readily seen, the system of controls is adaptable for use with various types of metering devices and for use with or without a sampling device. Other types of control mechanisms such as temperature compensators may be incorporated with the metering system as will be apparent to those skilled in the art.

Having fully described the nature, objects and operation of my invention, I claim:

1. A device for sampling fluids contained in a receptacle comprising a body member mounted on said receptacle provided with a valve chamber and a passageway, a housing mounted on said receptacle, piston means slidably arranged in said housing and having first and second positions adapted to remove a fluid sample from said receptacle, sealing means positioned in said housing adapted to close off fluid communication between the interior of said piston means below said sealing means and the interior of said housing when said piston means is in said first position and to permit fluid flow between the interior of said piston means below said sealing means and the interior of said housing when said piston means is in said second position, a valve member slidably arranged in said chamber having first and second positions adapted to fluidly communicate the interior of said piston means and said passageway when said valve means is in said second position, said piston means operatively engaging with said valve means to move said valve means to said second position when said piston means moves to said second position, said passageway fluidly communicating the exterior of said body and the interior of said piston means when said piston means is in said second position.

2. A device as recited in claim 1 wherein said sealing means positioned in said housing comprises a rod secured to said housing and extensible in said piston means and provided with a sealing member adjacent the free end thereof adapted to seal off the interior of said piston means when said piston means is in said first position.

3. A device for sampling fluids comprising a receptacle having oppositely disposed openings therein, a housing mounted on one of said openings, a hollow tubular piston member having a head thereon slidably arranged in said housing and extensible through said openings adapted to isolate a fluid sample in said receptacle, said head being provided with a beveeld surface, a rod secured to said housing and extensible in said piston member and provided with a sealing plug adjacent the free end thereof adapted to close off fluid communication between the interior of said housing and the interior of said piston member below said plug when said piston member is in one position and to fluidly communicate the interior of said housing and the interior of said piston member when said piston member is in another position, said beveled surface of said head facilitating said fluid communication between the interior of said housing and the interior of said piston member, a body member mounted on the other of said receptacle openings provided with a passageway fluidly communicating the interior and exterior of said body member, a valve member arranged in said body member adapted to fluidly comunicate the interior of said piston member and said passageway when said piston member extends through said openings and fluid pressure means operative in said housing for moving said piston member.

4. A fluid sampling and metering device comprising a metering tank provided with a first diaphragm actuated valve for controlling admission and discharge of fluid to and from said tank, a chamber mounted on said tank, a second diaphragm actuated valve positioned between said chamber and said tank adapted to selectively permit and prevent fluid flow therebetween, first control means connected to said chamber operatively responsive to the fluid level in said chamber, second control means fluidly communicating with said first valve operatively responsive to liquid discharge from said tank, a housing mounted on said tank, tubular piston means slidably arranged in said housing and extensible through said tank adapted to remove a fluid sample from said tank, a body member mounted on said tank provided with a passageway fluidly communicating the interior and exterior of said body member, third valve means arranged in said body member adapted to fluidly communicate the interior of said piston means and said passageway when said piston means extends through said tank; a pneumatic system including a fluid source, third and fourth diaphragm actuated valves arranged in said pneumatic system, said first and second control means cooperating to control actuation of said third valve which in turn controls actuation of said fourth valve, first valve and second valve, said fourth valve being adapted to control fluid flow to and from said piston means.

5. A device for sampling fluids contained in a receptacle comprising a body member mounted on said receptacle provided with a valve chamber and a first passageway, a housing mounted on said receptacle, a shaft arranged in said housing, a perforated guide tube positioned in said receptacle and connected to said shaft, a second passageway in said shaft fluidly communicating the interior of said housing and the interior of said guide tube, piston means slidably arranged on said shaft and said guide tube adapted to entrap a fluid sample within said guide tube, said piston means having first and second positions, a valve member slidably arranged in said chamber having first and second positions adapted to fluidly communicate the interior of said guide means and said first passageway when said valve member is in said second position, said piston means operatively engaging with said valve member to move said valve member to said second position when said piston means moves to said second position, said first passageway fluidly communicating the interior of said body member and the interior of said piston means when said piston means is in said second position, said piston means closing off fluid flow through said second passageway from the interior of said housing to the interior of said guide tube when in said first position and permitting fluid flow through said second passageway from the interior of said housing to the interior of said guide tube when in said second position and means arranged in said guide tube adjacent said second passageway adapted to prevent fluid flow through said second passageway from the interior of said guide tube to the interior of said housing.

6. In apparatus for metering and sampling fluid a metering device comprising a first tank provided with controlled fluid inlet and outlet means, a second tank positioned above said first tank, first valve means arranged between said first and second tanks adapted to selectively permit and prevent fluid flow therebetween, the volume of fluid contained in said first tank below said first valve means being the volume of fluid to be metered; a sampling device comprising a housing mounted on said first tank, tubular piston means slidably arranged in said housing and extensible through said first tank adapted to isolate a fluid sample in said first tank, second valve means positioned on said first tank adapted to fluidly communicate the interior of said piston means and the exterior of said first tank when said piston means extends through said first tank; and control means operatively responsive to a rising fluid level in said second tank adapted to actuate said first valve means and said piston means whereby when fluid communication between said first and second tanks is closed off by actuation of said first valve means, said piston means extends through said first tank and forces a sample of fluid from said first tank.

7. In apparatus for metering and sampling fluids a metering device comprising a metering tank provided with first valve means for controlling admission and discharge of fluid to and from said tank, a chamber mounted on said tank, second valve means positioned between said chamber and said tank adapted to selectively permit and prevent fluid flow therebetween, the volume of fluid contained in said tank below said second valve means being the volume of fluid to be metered; a sampling device comprising a housing mounted on said tank, tubular piston means slidably arranged in said housing and extensible through said tank adapted to isolate a fluid sample in said tank, a body member mounted on said tank provided with a passageway fluidly communicating the interior and exterior of said body member, third valve means arranged in said body member adapted to fluidly communicate the interior of said piston means and said passageway when said piston means extends through said tank; first control means connected to said chamber operatively responsive to the fluid level in said chamber, second control means fluidly communicating with said first valve means operatively responsive to fluid discharge from said tank; and signal transmission means operatively connecting said first and second control means with said first and second valve means and said housing, said first and second control means cooperating with said signal transmission means for actuating said first valve means for admitting fluid to said tank, actuating said second valve means to fluidly communicate said tank and said chamber, and actuating said piston means to retract said piston means; and for actuating said first valve means for discharging fluid from said tank, actuating said second valve means to close off fluid communication between said tank and said chamber and actuating said piston means to move said piston means through said tank.

8. A device for sampling fluids contained in a receptacle comprising a housing mounted on said receptacle, fluid pressure movable hollow means arranged to move from a first retracted position within said housing to a second extended position through said receptacle, sealing means positioned in said housing adapted to close off fluid communication between the interior of said movable means on one side of said sealing means and the interior of said housing when said movable means is in said first position and to permit fluid flow between the interior of said movable means and the interior of said housing when said movable means is in said second position, means for transmitting fluid pressure to said housing for moving said movable means from said first to said second position and from said second to said first position and means on said receptacle for permitting removal of the fluid sample in said movable means when said movable means is in said second position, fluid pressure in said housing forcing the sample from the movable means when the movable means is in the second position.

9. A device for sampling fluids contained in a receptacle comprising a housing mounted on said receptacle, a hollow piston member slidably arranged to extend from said housing through said receptacle adapted to entrap a fluid sample in said receptacle, a rod secured to said housing provided with a sealing plug adjacent the free end thereof, said sealing plug closing off fluid communication between the interior of said housing and the interior of said piston member on one side of said plug when said piston member is in said retracted position and fluidly communicating the interior of said housing and the interior of said piston member when said piston member is in extended position, fluid pressure means communicating with said housing adapted to move said piston member from its retracted to its extended position and vice-versa, and means for permitting removal of the fluid sample entrapped by the piston member when the piston member is in extended position, the fluid pressure in said housing forcing the fluid sample from the piston member when the piston member is in extended position.

10. A device for sampling fluids contained in a receptacle comprising a housing mounted on said receptacle, a shaft arranged in said housing, a perforated guide tube positioned in said receptacle and connected to said shaft, said shaft being provided with a passageway fluidly communicating the interior of said housing and the interior of said guide tube, movable means slidably arranged on said shaft and said guide means adapted to entrap a fluid sample within said guide means, said movable means being movable from a retracted position within said housing to an extended position through said receptacle, means arranged in said guide tube adjacent said passageway adapted to prevent fluid flow through said passageway from the interior of said guide tube to the interior of said housing, said movable means closing off fluid flow through said passageway from the interior of said housing to the interior of said guide tube when in said retracted position and permitting fluid flow through said passageway from the interior of said housing to the interior of said guide tube when in its extended position, fluid pressure means for moving said movable means from said retracted to said extended position and vice versa, and means arranged on said receptacle for permitting removal of said fluid sample entrapped within said guide tube, the fluid pressure in said housing forcing said fluid sample from said guide tube when the guide tube is in extended position.

References Cited in the file of this patent

UNITED STATES PATENTS

| | | |
|---|---|---|
| 1,341,898 | Gendar | June 1, 1920 |
| 1,386,301 | Adair et al. | Aug. 2, 1921 |
| 1,739,731 | Osborne | Dec. 17, 1929 |
| 1,876,958 | Kelly | Sept. 13, 1932 |
| 2,158,381 | Raymond | May 16, 1939 |
| 2,164,498 | Clark | July 4, 1939 |
| 2,351,764 | Jarrett | June 20, 1949 |
| 2,717,516 | Swift | Sept. 13, 1955 |

FOREIGN PATENTS

| | | |
|---|---|---|
| 947,663 | France | Jan. 17, 1949 |